Oct. 1, 1940.      LE GRANDE R. HOLLINGSHEAD    2,216,570
SAFETY DEVICE
Filed Feb. 25, 1938
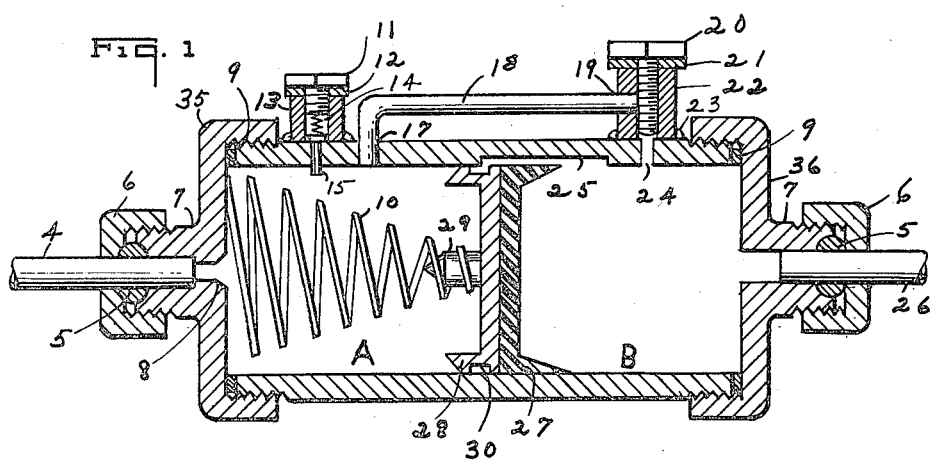
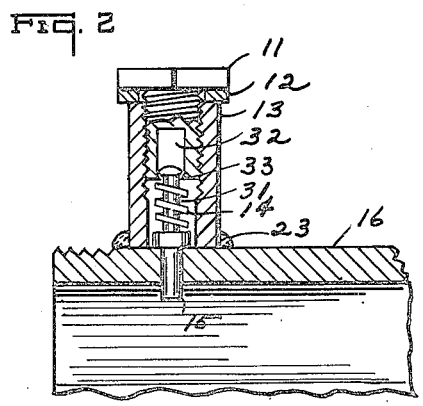
INVENTOR.
L. Rodney Hollingshead

UNITED STATES PATENT OFFICE 2,216,570

SAFETY DEVICE

Le Grande Rodney Hollingshead, Sacramento, Calif., assignor of ten per cent to A. Earl Lane, Yuba City, Calif.

Application February 25, 1938, Serial No. 192,551

3 Claims. (Cl. 303—84)

This invention relates to improvements in hydraulic brakes for motor vehicles, and more particularly to a check valve for each pipe line that leads from the master cylinder to each brake cylinder.

The principal object of this invention is to provide an automatic check valve for each pipe line that leads to each separate brake cylinder, so that should one of the flexible rubber tubes break or burst, which leads from the metal pipes to the brake cylinder, the check valve will automatically close and shut off the fluid from that particular brake; and leave the other three brake cylinders in full operation.

Another object of the invention is to provide a check valve which is fully automatic in operation, and will allow the pressure of the fluid to be automatically equalized in all parts of the hydraulic pipe line system; yet should a rubber hose or tube burst, only one check valve will shut off and remain shut off, so that the vehicle can be braked on its remaining brakes until the rubber tube can be repaired.

Another object of the invention is to provide a check valve which can be easily filled with fluid from the master cylinder; and all air bubbles removed from the said valve and hydraulic pipe line.

A further object of the said invention is to provide a check valve for the purposes intended, that can be quickly and easily installed on vehicles, cheap to manufacture, and will not easily get out of order.

These and other objects and advantages will appear when a careful perusal of the following specification is made.

In the drawing all similar parts are identically numbered.

Fig. 1 is a longitudinal cross section showing the assembled check valve and the relative arrangement of its elements.

Fig. 2 is a fragmentary section of the cylinder, showing a different locking device in vertical cross section.

Fig. 3 is a fragmentary section of the rubber tubing, which connects one end of the check valve and the brake cylinder.

In Fig. 1, cylinder 16 is threaded at both ends; cap 35 is screwed onto one end, and is sealed by washer 9. Cap 35 can be welded onto cylinder 16 and cap 36 threaded as shown. Caps 35 and 36 can have shanks 7 screw into them, instead of being cast as part of the cap, as shown in Fig. 1. Cone coil spring 10 is disposed about needle valve-stem 29, on piston 28, which is then inserted into cylinder 16. Needle valve-stem 29 seats against seat 8 in cap 35, which closes the exit leading to the brake cylinder. Needle valve stem 29, also pistons coil spring 10 in its proper place; and acts as a ramp so that piston 28 cannot be pushed beyond a fixed position at the end of cylinder 16.

Rubber cup 27 is next inserted into cylinder 16, which seals and prevents any fluid from escaping past it, before and after it has cleared groove 25 in cylinder 16, as shown in Fig. 1. Rubber cup 27 can be suitably disposed about piston 28 to prevent the leakage of fluid past it; or piston 28 can be sealed by other suitable means. Cap 36 is screwed onto cylinder 16, and sealed by washer 9.

Each hydraulic pipe line, which leads to a brake cylinder, is cut into two pieces, a few inches from where rubber tube 34, Fig. 3, is attached. Pipe 4, Figs. 1 and 3, is then inserted into threaded shank 7 on cap 35. Collar 5 and nut 6 are disposed about pipe 4, and when screwed into position, pipe 4 connects directly with rubber tube 34. Pipe 26 is similarly attached to cap 36, and leads to the master cylinder. The hydraulic line is continous, as before; but the fluid must pass through said check valve, as shown in Fig. 1.

When the foot pedal is applied, the hydraulic fluid presses on rubber cup 27; and recoils coil spring 10, which forces the fluid in chamber A out pipe 4, thus actuating the brake in the conventional manner. It will be noted that coil spring 10 is conical shaped, which permits maximum recoil.

The inner peripheral surface of cylinder 16, at one end, is provided with a very narrow and rectangular groove 25, which permits a few drops of fluid to pass from chamber B to chamber A, when piston 28 and rubber cup 27 are in such a position that groove 25 interconnects both chambers, as piston 28 is actuated back and forth. Groove 25 provides and insures a fixed volume of fluid to always be in each chamber, so that piston 28 will only recoil to a fixed position each time the brakes are applied; therefore, it will be impossible for piston 28 to ever be locked by latch pin 15, while the pipe line or rubber tube is intact. But should said rubber tube 34 burst or crack due to road friction, then the fluid in chamber A will escape; but when the brakes are applied, piston 28 and coil spring 10 will be fully recoiled, and latch pin 15 will engage groove 30 in piston 28, which automatically locks it in place. Piston 28 has its skirt slightly beveled at its outer periphery in order to facilitate the lifting of latch pin 15, which is slideable in sleeve 13. It should be noted that coil spring 10 forces piston 28 and rubber cup 27 forward beyond groove 25, so that should rubber tube 34 burst or crack, while the brakes are off, the fluid in the master cylinder and pipe line 26 could not leak out.

Rubber cup 27 and needle valve 29 completely seal the check valve, so that no more fluid can escape, thus the hydraulic line system remains intact; and the vehicle can be operated upon the three remaining brakes until repairs can be made.

It is obvious, therefore, that said check valve will prevent the total disability and loss of fluid, which renders the conventional hydraulic brake useless when a rubber tube bursts, as all the fluid is instantly lost.

To facilitate the filling of the check valve after it is installed, cylinder 16 is provided with threaded sleeve 22, which is welded at 23, and serves as a conduit valve. Hole 24 is drilled in cylinder 16 to provide a conduit from chamber B to chamber A via pipe 18, which is welded in sleeve 22 at hole 19, Fig. 1, and the other end at hole 17 in cylinder 16. The flow of fluid is regulated by cap screw 20, which screws into sleeve 22, and is sealed by washer 21. After the valve is filled, cap screw 20 is tightened. Cap screw 20 can be provided with a groove so that the fluid in chamber B can pass through pipe 18 into chamber A, which will eliminate groove 25 in the inner peripheral surface of cylinder 16, shown in Fig. 1. Said groove, in cap screw 20, would be small enough to allow only a few drops of fluid to pass, as piston 28 is actuated back and forth.

Threaded sleeve 13 is welded at the opposite end of cylinder 16, as shown in Figs. 1 and 2. It serves two functions: one, to let the air out of chamber A during the process of filling; and two, it retains latch pin 15, which automatically locks piston 28 into place, when groove 30 passes beyond latch pin 15. Latch pin 15 passes through cylinder wall 16, as shown in Figs. 1 and 2. Spring 14 impinges against cap screw 11, which allows latch pin 15 to slide and lock piston 28 in its safety position. Cap screw 11 is sealed by washer 12.

Fig. 2 shows a different form of latch pin 15, which is provided with stem 31 over which coil spring 14 is disposed. Stem 31 is provided with a ball at its end, which fits into cylinder recess 32 in cap screw 11; and the threaded shank of cap screw 11 is crimped at end 33, so that when cap screw 11 is removed, latch pin 15 and spring 14 will be removed as a unit. This arrangement of the elements makes it very easy to release latch pin 15, which releases piston 28 from its locked position. Thus it is apparent that the valve can be easily released without taking the valve apart or loss of fluid, by simply removing cap screw 11, which is readily accessible from the outside of cylinder 16. Rubber tube 34 is replaced in the conventional manner, and then the valve lock is released, without disconnecting the valve or pipe lines. Cap screw 20 is partly released so that the fluid in chamber B can pass through pipe 18 into chamber A, as coil spring 10 forces piston 28 and cup 27 forward to its regular position.

Cylinder 16 can be easily clamped to the chassis frame of the vehicle, or the rigidity of tubing 4 and 26 will hold it in place, as it is relative small in dimension.

It is apparent from the structure of the check valve that accidents will be avoided which are caused by a rubber tube bursting, while the car is traveling or being braked, as all the fluid in the pipe line is not lost. It is a well known fact that an operator will wait until he is a few feet from danger or a stopped car before he applies his brakes; and if he finds that he has none, he is so frightened that he does not think to operate his emergency brake until he has smashed up his car or it is too late. By reason of the construction of the check valve as hereinbefore described such an accident can be safely avoided, as the other brakes remain in full operation.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a check valve including a tubular body, a piston in the body, and a latch assembly associated with the body and arranged to engage and lock the piston against movement upon predetermined movement of the same in one direction; said latch assembly comprising a sleeve fixed on the body radially thereof, the body having an opening therethrough in register with the inner end of the sleeve, a cap screw threaded into the outer end of the sleeve, the shank of said cap screw having an axial bore therein open to its inner end, a latch pin disposed in the sleeve and normally projecting through said body opening into the body, a ball on the outer end of the latch pin, said ball being slidably engaged in the bore of the cap screw and normally disposed adjacent its inner end, means to prevent escape of the ball from said bore, a shoulder on the pin intermediate the body and the lower end of the cap screw, and a compression spring surrounding the pin between said shoulder and said end of the cap screw.

2. In a check valve having a tubular body, a piston slidable in the body and a latch assembly mounted on the body to engage and lock the piston against return movement from a predetermined position; said assembly comprising a sleeve fixed on the body radially thereof, the body having an opening registering with the sleeve, a latch pin disposed in the sleeve and normally projecting through said body opening and into the body, a screw element mounted on the sleeve for axial movement and exposed for operation to the outer end of the sleeve and means connecting the element and pin so as to withdraw the latter from the body with axial movement of the element in a direction away from the body while allowing of unrestricted movement of the pin in said direction by pressure exerted from within the body.

3. In a check valve having a tubular body, a piston slidable in the body and a latch assembly mounted on the body to engage and lock the piston against return movement from a predetermined position, said assembly comprising a sleeve fixed on the body radially thereof, the body having an opening registering with the sleeve, a latch pin disposed in the sleeve and normally projecting through said body opening and into the body, a screw element mounted on the sleeve for axial movement and exposed for operation to the outer end of the sleeve, said element including a portion projecting into the sleeve and at its inner end having a bore surrounding the pin with a sliding fit and an enlarged head on the pin disposed radially outward from said bore.

LE GRANDE RODNEY HOLLINGSHEAD.